United States Patent [19]
Gardner

[11] 3,829,180
[45] Aug. 13, 1974

[54] PAD CONSTRUCTION FOR TILTING PAD THRUST BEARING

[75] Inventor: Willis W. Gardner, Waukesha, Wis.

[73] Assignee: Waukesha Bearings Corporation, Waukesha, Wis.

[22] Filed: Apr. 16, 1973

[21] Appl. No.: 351,682

[52] U.S. Cl. .............................................. 308/160
[51] Int. Cl. ............................................ F16c 17/06
[58] Field of Search ...................... 308/160, 238, 73

[56] References Cited
UNITED STATES PATENTS
3,565,498    2/1971    Leopard et al. .................... 308/160

Primary Examiner—Charles J. Myhre
Assistant Examiner—Frank Susko
Attorney, Agent, or Firm—Arthur L. Morsell, Jr.

[57] ABSTRACT

A tilting pad for a thrust bearing is formed of steel and faced with a layer of graphite-fiber composite material. This provides good bearing properties, a low coefficient of thermal expansion parallel to its surface, and a low coefficient of thermal conductivity transverse to its surface. The facing material insulates the bearing pad from oil-sheer heat and thus increases the load capacity of the pad by reducing the tendency to bend which is customarily caused by a temperature differential across a pad. The facing material is made of criss-crossed layers of graphite fibers embedded in a resin, the fibers being oriented in directions substantially parallel with the surface of the steel pad.

12 Claims, 5 Drawing Figures

DISTORTION OCCURRING IN PRIOR ART

PAD CONSTRUCTION FOR TILTING PAD THRUST BEARING

BACKGROUND OF THE INVENTION

Tilting pad thrust bearings contain a plurality of bearing pads which are each tiltably supported in a retainer ring by a hardened pivot button which is mounted in a bore in the bottom of the pad. The pads are flood lubricated and engage a rotating thrust collar or runner which rides on an oil film on the face of the bearing pads. The bearing pads are usually made of a relatively rigid material such as steel and are usually faced with a good bearing material such as babbitt.

As the runner rotates, it shears the oil film that separates it from the face of the bearing pads and generates heat at the surface of the pads. This produces a differential of temperature across each pad and causes it to bend downwardly. The downward bending of the pad distorts the oil film on the pad's bearing surface and decreases its load-bearing capacity. The mechanical load on the pad causes a further downward bending of the pad about its pivot point and adds to the decrease in loadbearing capacity, but the bending due to temperature differences is normally several times greater than that due to pressure.

The bending of the bearing pads due to temperature differences has been decreased somewhat in the past by using pad material which has relatively high thermal conductivity such as high strength copper with a babbitt face or bearing aluminum. The relatively high thermal conductivity of copper and aluminum has led to a lower differential of temperature across the pads and consequently to lower thermal deflections. This improvement has been offset, however, by the fact that high strength copper and bearing aluminum deflect more easily than steel under pressure, and the increased deflections due to pressure tend to offset the decreased deflections due to lower temperature differentials. Therefore, although the use of high strength copper and bearing aluminum for the thrust pads provides an increase in load capacity over steel, the increase is considerably less than is theoretically possible if the temperature-induced deflections could be minimized without increasing the pressure-induced deflections.

Accordingly, one object of this invention is to provide a thrust bearing construction in which the temperature-induced deflections of the pad are minimized by the unobvious means of decreasing thermal conduction through the pad, without increasing the pressure-induced deflections. A normal approach would be to increase thermal conduction.

Another object of this invention is to provide a thrust bearing construction of the above-noted type in which a flat pad surface is effectively maintained, and which construction is simple and sturdy and inexpensive in cost.

Other objects and advantages of the invention will be apparent to those skilled in the art from the following description of one embodiment thereof.

SUMMARY OF THE INVENTION

In accordance with this invention, the foregoing objects are attained by a unique facing of the thrust bearing pads with a novel layer of material which has good bearing properties, a low coefficient of thermal expansion parallel to its surface, and a low coefficient of thermal conductivity transverse to its surface. The low thermal conductivity transverse to the surface insulates the pad from the oil-shear heat and thus minimizes temperature-induced deflection of the pad. The low coefficient of thermal expansion parallel to the surface allows the facing material to withstand relatively high temperatures without significant dimensional distortion. In the preferred embodiment of the invention, the facing material is made of criss-crossed layers of graphite fibers embedded in a resin, the fibers being oriented substantially parallel with the surface of the steel pad.

DESCRIPTION OF THE PREFERRED EMBODIMENT

Figure 1:
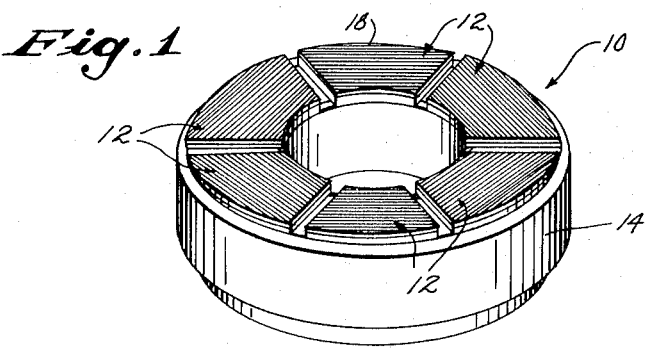
FIG. 1 is a perspective view of one illustrative thrust bearing structure of this invention.

FIG. 1 shows a thrust bearing 10 in which a plurality of pads 12 are mounted within a bearing shell or housing 14 by well known prior art means. As shown in FIG. 3, each of the bearing pads 12 is made up of a relatively thick backing 16 and a relatively thin layer of facing material 18. Each of the pads 12 is tiltably supported on a frame member 20 by a hardened pivot button 22 which is seated in a bore 24 in the bottom of backing 16. The bottom of the pivot button 22 is spherical in shape to provide a tiltable point contact between pad 12 and frame member 20. A runner 26 which is not shown in FIGS. 1 and 2 rotates across the facing 18 of the pads 12 and is supported thereon by a film of oil, as is well known in the art. The oil film is derived from well known prior art flood lubrication means which are omitted from the drawings for clarity of illustration. The distribution of the oil film pressure is illustrated by the curve 28 whose height signifies the amount of pressure at the location directly below.

Figure 5:
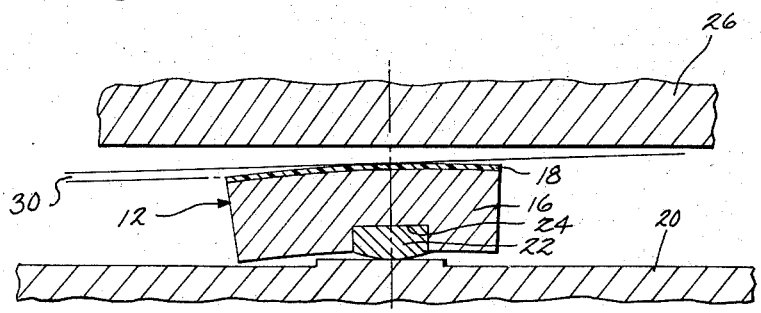
FIG. 5 is a view similar to FIG. 3 showing the pad-bending produced in the prior art by a combination of pressure and temperature differentials.

The general configuration of the bearing pad 12 and its relation to frame 20 and runner 26 and to the oil film is the same as the prior art and will be referred to in describing the problem which this invention solves. The theory of hydrodynamic film-lubricated tilting pad thrust bearings is well known to those skilled in the art and will not be repeated herein. This theory has been experimentally proven and indicates that maximum load capacity results when the pivot location is offset circumferentially in the direction of rotation to an optimum position approximately 0.6 the length of the pad from its leading edge, and when the bearing surface of the pad is flat. The optimum location for the pivot button is easy to achieve, and an initial flat bearing surface for the pad is easy to achieve, but difficulty has been experienced in the past with regard to temperature and pressure-induced downward bending of the pads, illustrated in FIG. 5, which causes a downward deflection 30 of the bearing surface of pad 12 from its original flat condition shown in FIG. 3. The downward deflection 30 distorts the oil film between the bearing surface of pad 12 and the runner 26 and causes a significant decrease in the load-bearing capacity. It should be noted that the deflection 30 is exaggerated in FIG. 5 for clarity of illustration. In actual practice, the deflection for a typical babbitt-faced steel pad is 0.000457 inches. Although this deflection is relatively small, it has a significant affect on the load-bearing capacity of the bearing.

The downward deflection 30 is made up of a component which is due to downward pressure on the pad 12 and a component which is due to a temperature differential across the pad 12. The temperature differential is caused by heat generated in the oil film by shearing of the film as the runner rotates over the bearing pads. Analysis shows that the temperature-induced deflection is several times larger in magnitude than the pressure-induced deflection. In the case of a typical babbitt-faced steel pad, the pressure-induced deflection is 0.000065 inches while the temperature-induced deflection is 0.000392 inches.

In the past, the deflection of the pads has been reduced somewhat by using a pad material which has a relatively high thermal conductivity. High strength copper and bearing aluminum have been used. Both of these materials have served to reduce the temperature-induced deflections, but they have the drawback of also increasing the component of deflection which is due to pressure, thereby limiting the net reduction of deflection. For example, bearing aluminum, which gives the greatest net reduction of deflection, has a pressure-induced deflection of 0.000134 inches as compared to 0.000065 inches for steel, but the temperature-induced deflection of the bearing aluminum is only 0.000154 as compared to 0.000392 for steel. Thus the net deflection for aluminum is 0.000288 as compared to 0.000457 for steel. It will be clear, however, that a significantly greater reduction is possible if the temperature-induced deflection can be reduced without increasing the pressure-induced deflection, and this is the principal object of this invention.

Unlike the prior art, which sought to reduce the temperature-induced deflections by increasing the thermal conductivity of the pad material, the basic concept of this invention is the unobvious approach of using an insulating material for the bearing surface of the pad to insulate the pad from the heat developed by the shearing of the oil film. This minimizes the temperature differential across the pad and thus minimizes the temperature-induced deflection without increasing the pressure-induced deflection. In addition to being a good heat insulator, the material used for the bearing surface should also have good bearing properties. In addition, the material preferably should have a relatively low coefficient of thermal expansion in the plane of its surface. One suitable material which has these characteristics is graphite fiber composite material. It is composed of high strength graphite fibers which are embedded in a second material, commonly one of many thermosetting or thermoplastic resins such as epoxy, nylon, teflon, polyimide, or the like. For use in bearings, the graphite fibers are commonly arranged in layers in the plane of the resin sheet with alternate layers criss-crossed to provide for uniform properties in the plane of the resin sheet. These sheets are built up to the thickness appropriate for thrust pad facings, e.g. 0.01 to 0.1 inches, and are bonded to the face of the pad with a suitable epoxy cement or the like. Tests show that the total deflection of a steel pad faced with this material is only 0.000121 inches as compared to 0.000457 inches for a babbitt-faced steel pad and 0.000288 inches for a pad made of bearing aluminum. Thus the pad construction of this invention has proven to be significantly more effective than the best known prior art pad in reducing the total amount of pad deflection due to pressure and to temperature. This provides a very substantial increase in the load-bearing capacity of the pad without any significant increase in cost.

Figure 2:
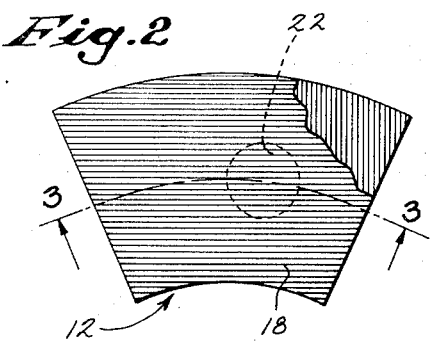
FIG. 2 is a plan view of one thrust bearing pad of this invention with a portion of the facing material cut away to reveal its criss-crossed fibers.
Figure 4:
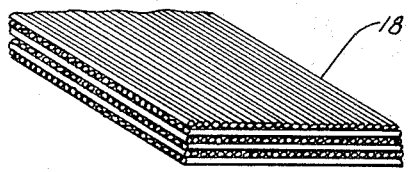
FIG. 4 is an enlarged fragmentary view of a corner of the facing material showing its criss-crossed fibers.
Figure 3:
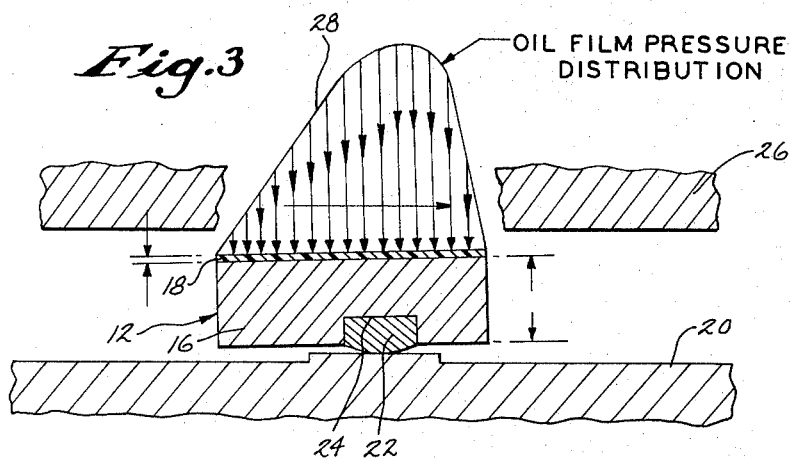
FIG. 3 is a developed sectional view taken on the line 3—3 of FIG. 2 combined with a graph showing the distribution of pressure within the oil film which supports a runner rotating over the bearing surface of the bearing pad.

FIGS. 2 and 4 illustrate the criss-crossed fiber construction used in the bearing face material of this invention, the diameter of the fibers being greatly exaggerated for purposes of illustration. In a typical example, the diameter of the fibers would be 0.00033 inches, although larger or smaller diameters could be used depending on the properties desired. The adjacent layers of fibers are shown as being at right angles to each other, but it should be understood that the angle between fibers in different layers is not critical and could be changed if desired. The important point is that all of the fibers are generally parallel with the plane of the bearing surface. This is the factor that gives the relatively low coefficient of thermal conductivity transverse to the bearing surface and the relatively low coefficient of thermal expansion parallel to the bearing surface. The criss-crossing of adjacent layers is, however, desirable because it increases strength and provides uniformity of temperature characteristics in the plane of the bearing surface. In addition to the above-noted desirable characteristics, the graphite fiber composite material also has high strength and modulus of elasticity in the plane of the fibers. The coefficient of thermal expansion is negative in sign, i.e., an increase in temperature causes a slight reduction in length.

The above-described graphite fiber composite material is obtainable from the Celanese Corporation of Summit, New Jersey. The graphite fibers that are used in the material are designated by the Celanese Corporation by the trade name CELION GY-70, which is a trademark of the Celanese Corporation.

It might appear that the use of a good heatinsulating material for the bearing surface would tend to increase the temperature of the oil film, but tests have shown that bearing surface temperatures are lower with the facing of this invention than with a steel-backed, babbitted thrust pad of the same geometry, particularly at higher P.S.I. loadings, e.g., above 500 P.S.I. This results from the improved flatness which is maintained, developing a greater oil film thickness which reduces the rate of heat generation and thus temperature, and in high speed bearings the majority of the heat generated is carried away by the oil which flows through the film with only a small portion being conducted through the pad material. So a small change in this latter portion of heat flow has little affect on surface temperatures.

To obtain an indication of the theory of this invention, a simplified analysis is given here:
The nomenclature used is as follows:
$Yp$ = Deflection due to oil film pressure, in.
$Yr$ = Deflection due to temperature difference, in.

W = Load on pad, pounds
r = Distance from reference point (pivot location) to point at which deflection is to be determined, in. (Note: Deflection is assumed zero at the reference point.)
t = Pad thickness, in.
E = Modulus of elasticity, PSI
T = Temperature, °F
ΔT = Temperature difference, °F
α = Coefficient of thermal expansion, in./in. °F
k = Coefficient of thermal conductivity, BTU/Min., in., °F Previous analysis (Thrust Pad Deflections — W.W.G. 8-3-62) has established the following simplified expressions for the deflections of interest:

$$Yp = 0.224 \, (Wr^2/Et^3)$$

$$Yr = (\Delta T r^2 \alpha)/2t$$

Referring to the above definitions and equations, the low thermal conductivity of the composite (across the fiber direction) results in a high ΔT value. The facing is also thin ($t$ is small) and these two factors would normally lead to large thermal distortions ($Yr$). However, with the low coefficient of thermal expansion value ($\alpha$) the net result is small thermal distortions. And, since $\alpha$ is a negative term, these distortions tend to be opposite to that normally encountered. Taken alone, the pressure distortions of the facing (composite) would be prohibitive due to the low $t$ value even though E is high. The steel backing, however, provides mechanical support with its high modulus and strength. And — since the composite is acting as an insulator (across the fiber direction), the heat flow through the composite is low. The steel backing then remains cooler with a low ΔT. So, the thermal distortions of both the composite facing and the steel backing are low. The resulting distortions are limited (and controlled) by the steel backing. Slight differentials in thermal expansions at the bond between the composite facing and the backing are absorbed by the bonding agent (generally an epoxy cement).

Thus it can be seen that this combination of materials and their unique properties provides a pad in which thermal distortions are essentially eliminated (and these were the major problem) and pressure distortions are minimized. This provides for improved flatness of the bearing surface under operating conditions and thus improved load capacity.

It was noted above that the graphite fiber composite material has good bearing properties. This is a result both of the graphite fibers and of the relatively soft matrix in which they are embedded. The graphite fibers have a low coefficient of friction when run against another surface. This is important in oil film bearings primarily under start-up conditions when pad-to-runner contact is made prior to establishment of the lubricating film. Or, if contact is made while running, as may occur due to an overload, the graphite lubricates as it is worn away, thus protecting the mating runner. In forms previously used, the graphite was sintered into a dense, hard material which lacked the desirable bearing properties of embedability and conformability obtained with the common babbitts. With the composite material used in this invention, however, the graphite is present to provide good rubbing characteristics while the softer matrix material provides a high degree of embedability and conformability.

The following table shows typical values for physical properties of materials referred to herein:

| | Steel | High Strength Copper | Bearing Aluminum | Tin Babbitt | Graphite Fiber/Epoxy Composite | |
| --- | --- | --- | --- | --- | --- | --- |
| | | | | | In Plane of Fibers | Across Plane of Fibers |
| a. Modulus, E, PSI | $29 \times 10^6$ | $17 \times 10^6$ | $10.3 \times 10^6$ | $7.6 \times 10^6$ | $42 \times 10^6$ | Low |
| b. Coefficient of thermal expansion, α, in/in °F | $6.3 \times 10^{-6}$ | $9.2 \times 10^{-6}$ | $12.8 \times 10^{-6}$ | $12.8 \times 10^{-6}$ | $-0.65 \times 10^{-6}$ | $16.5 \times 10^{-6}$ |
| c. Thermal conductivity, k, BTU/H$_R$Ft °F | 29 | 186 | 102 | 35 | 50 | 0.5 |

What I claim is:

1. In a tilting pad thrust bearing having a plurality of rigid pads which are each tiltably supported in a retainer and having a runner which is rotatable over the faces of said pads, and having means for flood-lubricating said bearing to produce an oil film between the face of each pad and the adjacent surface of said runner, the improvement wherein each of said pads is faced with a material having good bearing properties and having a relatively low coefficient of thermal conductivity transverse to the face of said pad, said facing material acting as a heat insulator to retard the flow of heat from said oil film to said pad, thereby reducing the temperature differential across the pad and consequently reducing the amount of temperature-induced bending of the pad, whereby the load capacity of the bearing is substantially increased, said facing material having a relatively low coefficient of thermal expansion parallel to the face of said pad.

2. The improvement defined in claim 1 wherein said facing material is a graphite fiber composite material.

3. The improvement defined in claim 2 wherein the fibers of said graphite fiber composite material are substantially parallel to the face of said pads.

4. The improvement defined in claim 3 wherein the fibers of said graphite fiber composite material are arranged in criss-crossed layers.

5. The improvement defined in claim 2 wherein said graphite fiber composite material comprises graphite fibers embedded in a resin.

6. The improvement defined in claim 5 wherein said resin is chosen from the group comprising epoxy, nylon, teflon, and polyimide.

7. The improvement defined in claim 4 wherein said criss-crossed layers of graphite fibers are embedded in epoxy.

8. The improvement defined in claim 1 wherein said facing material is bonded to the face of said pad by an epoxy cement.

9. The improvement defined in claim 1 wherein said facing material is between 0.01 and 0.1 inches in thickness.

10. The improvement defined in claim 1 wherein said pads are made of steel.

11. The improvement defined in claim 1 wherein the facing material includes fibers which are arranged substantially parallel to the face of said pads.

12. The improvement defined in claim 11 wherein the fibers of said facing material are arranged in criss-crossed layers.

* * * * *